US012647493B2

(12) United States Patent
Umeya et al.

(10) Patent No.: US 12,647,493 B2
(45) Date of Patent: *Jun. 2, 2026

(54) PROGRAM, METHOD, AND SYSTEM FOR MANAGING USE OF APPLICATION

(71) Applicant: GREE, Inc., Tokyo (JP)

(72) Inventors: Tomoki Umeya, Tokyo (JP); Junko Yamanokuchi, Tokyo (JP); Masato Nozaki, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 18/637,791

(22) Filed: Apr. 17, 2024

(65) Prior Publication Data

US 2025/0328608 A1      Oct. 23, 2025

Related U.S. Application Data

(63) Continuation of application No. 17/346,305, filed on Jun. 14, 2021, now Pat. No. 11,997,175, which is a (Continued)

(30) Foreign Application Priority Data

Jul. 31, 2017      (JP) ................................. 2017-148655

(51) Int. Cl.
*H04L 67/50* (2022.01)
*G06F 21/10* (2013.01)
(Continued)

(52) U.S. Cl.
CPC .......... *H04L 67/535* (2022.05); *G06F 21/121* (2013.01); *G06F 21/31* (2013.01); *G06F 21/1064* (2023.08); *G06F 2221/2149* (2013.01)

(58) Field of Classification Search
CPC ......... G06F 21/12; G06F 21/31; H04L 43/04; H04L 43/0876
(Continued)

(56) References Cited

U.S. PATENT DOCUMENTS 8,064,789 B2 * 11/2011 Moroi ................ H04N 1/00965
399/80
8,640,198 B2 * 1/2014 Raleigh ............... H04L 12/1407
726/2
(Continued)

FOREIGN PATENT DOCUMENTS

JP      2001-218976 A      8/2001
JP      2009-042991 A      2/2009
(Continued)

OTHER PUBLICATIONS

Office Action issued Aug. 26, 2025 in Japanese Patent Application No. 2024-157170.
(Continued)

*Primary Examiner* — James N Fiorillo
(74) *Attorney, Agent, or Firm* — XSENSUS LLP

(57) ABSTRACT

A system includes a first device including first circuitry; and a second device including second circuitry, the first circuitry of the first device sets a first use restriction condition for the second circuitry of the second device, the first use restriction condition being for restricting execution of the applications executable by the second circuitry of the second device to be within a specific period of time of a day, sends information related to the first use restriction condition to a management server, and receives, from the management server, a determination of whether the second device has satisfied the first use restriction condition a predetermined number of times, and in response to the first use restriction condition being satisfied the predetermined number of times, the second (Continued)

device receives the one or more rewards from the management server.

18 Claims, 6 Drawing Sheets

Related U.S. Application Data continuation of application No. 16/046,447, filed on Jul. 26, 2018, now Pat. No. 11,159,632.

(51) Int. Cl.
    *G06F 21/12*         (2013.01)
    *G06F 21/31*         (2013.01)
(58) Field of Classification Search
    USPC .......................................................... 726/28
    See application file for complete search history.

(56) References Cited

U.S. PATENT DOCUMENTS

| | | | |
|---|---|---|---|
| 9,111,105 B2 * | 8/2015 | Barton | G06F 21/604 |
| 9,374,379 B1 * | 6/2016 | Hew | H04L 63/108 |
| 10,097,347 B2 * | 10/2018 | Nagao | H04L 9/0822 |
| 10,558,546 B2 * | 2/2020 | Cranfill | H04L 63/102 |
| 2003/0028622 A1 * | 2/2003 | Inoue | H04N 21/8355 709/219 |
| 2005/0096009 A1 * | 5/2005 | Ackley | H04M 1/663 455/414.1 |
| 2008/0163323 A1 * | 7/2008 | Lee | H04H 20/91 725/115 |
| 2009/0271514 A1 * | 10/2009 | Thomas | G06F 11/3438 709/224 |
| 2010/0121964 A1 * | 5/2010 | Rowles | H04L 47/10 709/229 |
| 2010/0235923 A1 * | 9/2010 | Schepis | G06F 21/121 726/1 |
| 2012/0011069 A1 * | 1/2012 | Kazawa | G06F 21/10 705/59 |
| 2012/0215662 A1 * | 8/2012 | Ito | H04L 63/102 705/26.61 |
| 2013/0040604 A1 * | 2/2013 | Sprigg | H04L 51/212 455/410 |
| 2013/0122854 A1 * | 5/2013 | Agarwal | H04L 12/141 455/405 |
| 2013/0143528 A1 * | 6/2013 | Randazzo | H04W 4/027 455/411 |
| 2013/0254660 A1 * | 9/2013 | Fujioka | A63F 13/12 715/741 |
| 2013/0325527 A1 * | 12/2013 | Etchegoyen | G06Q 10/02 705/26.82 |
| 2014/0068755 A1 * | 3/2014 | King | G06F 3/04883 726/19 |
| 2014/0272894 A1 * | 9/2014 | Grimes | G06F 21/62 434/350 |
| 2014/0280934 A1 * | 9/2014 | Reagan | H04L 47/70 709/225 |
| 2014/0280944 A1 * | 9/2014 | Montgomery | H04L 67/52 709/225 |
| 2014/0337997 A1 * | 11/2014 | Beck | G06F 21/60 726/27 |
| 2014/0347983 A1 * | 11/2014 | Griot | H04L 47/263 370/230 |
| 2015/0032887 A1 * | 1/2015 | Pesek | H04W 12/08 709/224 |
| 2015/0248543 A1 * | 9/2015 | Yoshinari | G06Q 50/10 726/28 |
| 2016/0011912 A1 * | 1/2016 | Rangaraju | G06F 21/121 718/105 |
| 2016/0042620 A1 * | 2/2016 | Dandie | G06F 11/3013 340/568.3 |
| 2016/0087854 A1 * | 3/2016 | Jayanti Venkata | G06F 8/71 709/224 |
| 2016/0188888 A1 * | 6/2016 | Dutch | G06F 21/6245 726/28 |
| 2016/0232336 A1 * | 8/2016 | Pitschel | G06F 21/305 |
| 2016/0255117 A1 * | 9/2016 | Sinha | G06F 21/56 726/1 |
| 2016/0292060 A1 * | 10/2016 | Mathew | H04L 63/10 |
| 2017/0004319 A1 * | 1/2017 | Goldsack | G06F 21/577 |
| 2017/0078886 A1 * | 3/2017 | Raleigh | H04W 12/086 |
| 2017/0149795 A1 * | 5/2017 | Day, II | H04L 63/108 |
| 2017/0228550 A1 * | 8/2017 | Harb | H04N 21/4532 |
| 2018/0165467 A1 * | 6/2018 | Yablokov | G06F 21/31 |
| 2018/0181728 A1 * | 6/2018 | Lewis | G06F 21/105 |
| 2018/0365412 A1 * | 12/2018 | Israel | H04L 67/10 |
| 2019/0036975 A1 * | 1/2019 | Beckman | H04L 67/565 |

FOREIGN PATENT DOCUMENTS

| | | |
|---|---|---|
| JP | 2010-039786 A | 2/2010 |
| JP | 2010-218552 A | 9/2010 |
| JP | 2011-070524 A | 4/2011 |
| JP | 2011-100226 A | 5/2011 |
| JP | 5043431 B2 | 10/2012 |
| JP | 2014-533383 A | 12/2014 |
| JP | 2015-528674 A | 9/2015 |
| JP | 2016-013151 A | 1/2016 |
| JP | 2016123561 A | 7/2016 |
| KR | 20090010459 A | 1/2009 |
| WO | 2016/020984 A1 | 2/2016 |

OTHER PUBLICATIONS

Notice of Reasons for Refusal mailed Feb. 16, 2021 in corresponding Japanese Patent Application No. 2019-235366, 8 pages.

Office Action issued May 21, 2019 in Japanese Patent Application No. 2017-148655, 17 pages.

Ex Parte Gross, Patent Trial and Appeal Board (PTAB) Appeal 2011-004811, Jan. 13, 2014 (Year: 2014).

Felt AP, Greenwood K, Wagner D. The effectiveness of application permissions. In Proceedings of the 2nd USENIX conference on Web application development Jun. 15, 2011 (pp. 7-7). (Year: 2011).

* cited by examiner

Fig.2

| Manager | User | Application to be Managed | Use Condition |
|---|---|---|---|
| ID0010 | ID0201 | App A | 1000 yen per month |
| | | App B | 1 hour per day |
| | | ⋮ | ⋮ |
| | ID0202 | App P | Only holiday |
| | | App Q | Available until 8 p.m. |
| | | ⋮ | ⋮ |
| ID0011 | ID0301 | App S | 2000 yen per month |
| | | App T | No restriction |
| | | ⋮ | ⋮ |

Fig.3A

┌─────────────────────────── ⌐100
│ First User Terminal
│ (Manager)
│ ┌──────────────────────── ⌐110
│ │ Application
│ │ ┌──────────────────── ⌐110A
│ │ │ Management Module │
│ │ └────────────────────
│ └────────────────────────
└───────────────────────────

Fig.3B

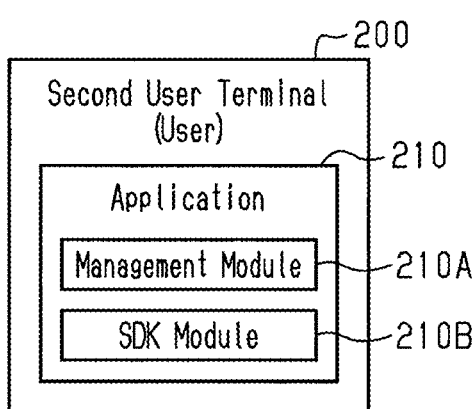

┌─────────────────────────── ⌐200
│ Second User Terminal
│ (User)
│ ┌──────────────────────── ⌐210
│ │ Application
│ │ ┌──────────────────── ⌐210A
│ │ │ Management Module │
│ │ └────────────────────
│ │ ┌──────────────────── ⌐210B
│ │ │ SDK Module │
│ │ └────────────────────
│ └────────────────────────
└───────────────────────────

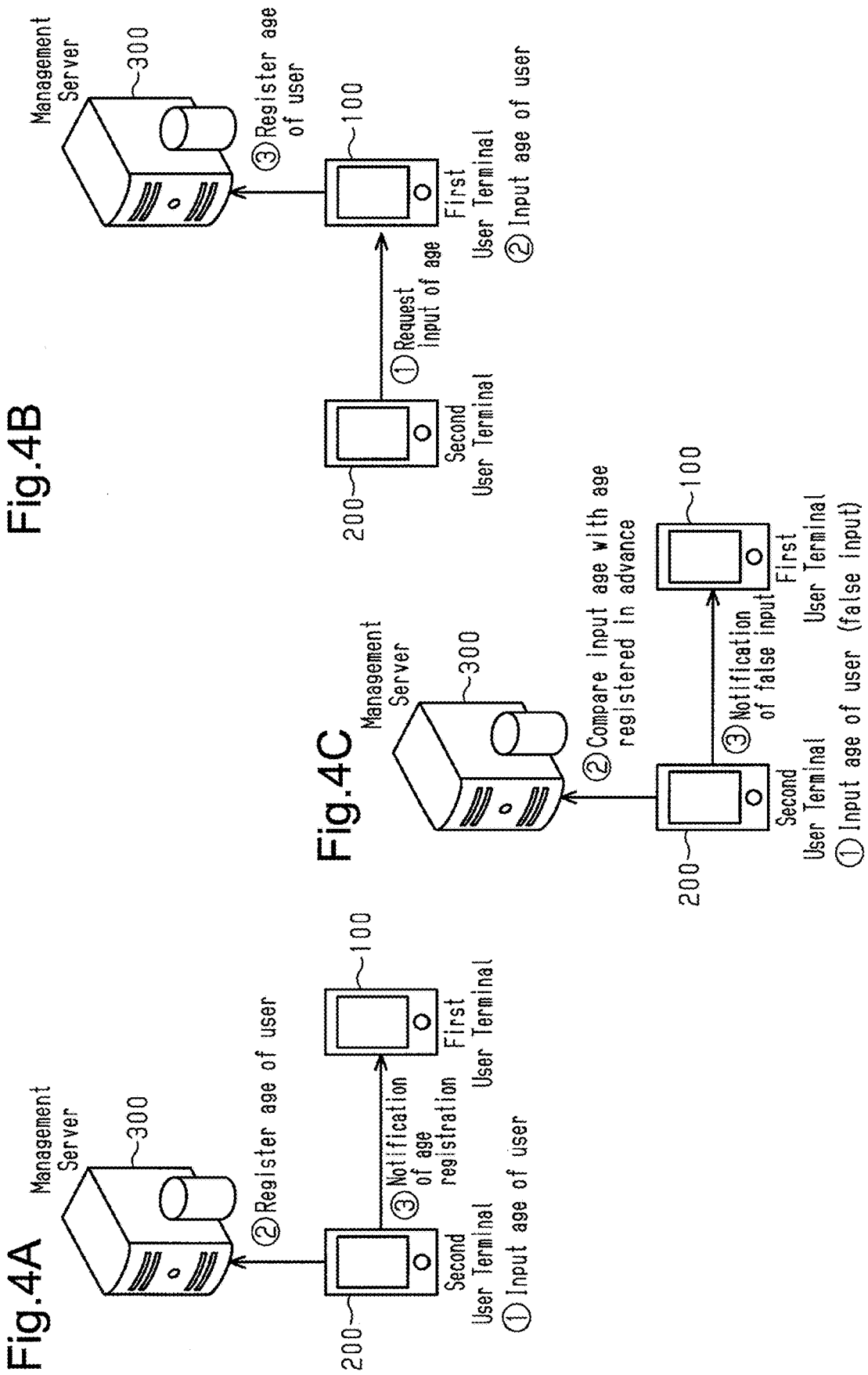

Fig.5

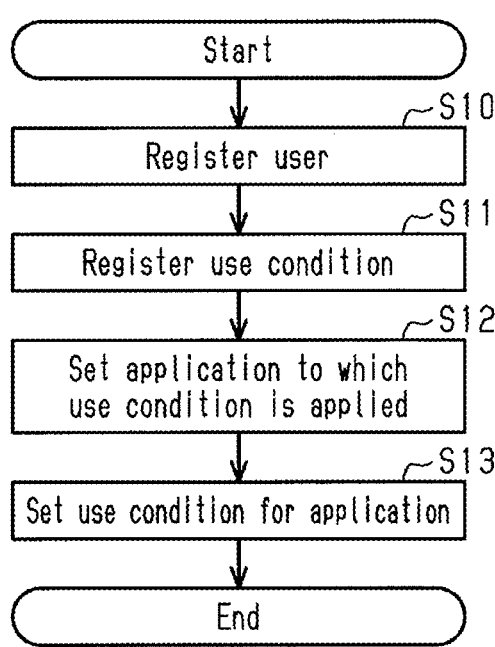

```
                    Start
                      │
                      ▼                    ~S10
        ┌─────────────────────────────┐
        │        Register user        │
        └─────────────────────────────┘
                      │
                      ▼                    ~S11
        ┌─────────────────────────────┐
        │    Register use condition   │
        └─────────────────────────────┘
                      │
                      ▼                    ~S12
        ┌─────────────────────────────┐
        │     Set application to which │
        │     use condition is applied │
        └─────────────────────────────┘
                      │
                      ▼                    ~S13
        ┌─────────────────────────────┐
        │ Set use condition for application │
        └─────────────────────────────┘
                      │
                      ▼
                    End
```

Fig.6

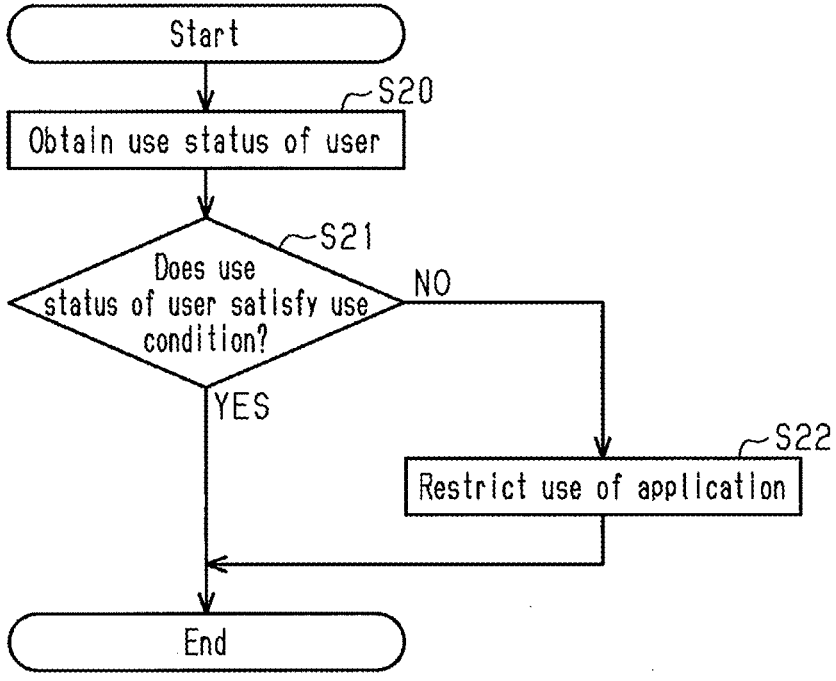

```
                    Start
                      │
                      ▼                    ~S20
        ┌─────────────────────────────┐
        │   Obtain use status of user │
        └─────────────────────────────┘
                      │
                      ▼                    ~S21
                  ╱Does use╲
         ╱status of user satisfy use╲  NO
         ╲      condition?         ╱─────┐
                  ╲        ╱            │
                   YES                  ▼           ~S22
                    │          ┌─────────────────────────┐
                    │          │ Restrict use of application │
                    │          └─────────────────────────┘
                    │                   │
                    ◄───────────────────┘
                    ▼
                   End
```

Use Condition
(2000 yen per month)

App A

App B

App C

App D

App E

Use Condition
(1000 yen per month
Weekday: 1 hour
Saturday & Sunday: 2 hours)

App F        App J

App G        App K

App H

App I

Use Condition
(None)

App L

App M

App N

PROGRAM, METHOD, AND SYSTEM FOR MANAGING USE OF APPLICATION

CROSS-REFERENCE TO RELATED APPLICATIONS

The present application is a continuation of U.S. application Ser. No. 17/346,305, filed Jun. 14, 2021, which is a continuation of U.S. application Ser. No. 16/046,447, filed Jul. 26, 2018 (now U.S. Pat. No. 11,159,632) which claims priority to JP 2017-148655, filed on Jul. 31, 2017, the entire contents of each are incorporated herein by its reference.

BACKGROUND

The present invention relates to a program, a method, and a system for managing the use of an application.

Some of the conventional systems manage the use of an application by prohibiting access to the application. For example, Japanese Laid-Open Patent Publication No. 2010-218552 describes a system for identifying an attribute of a media file and managing access to an application based on a parental control policy on the attribute of the media file.

However, the system of Japanese Laid-Open Patent Publication No. 2010-218552 only prohibits access to an application and cannot permit children (users) to use the application within a proper range.

SUMMARY

It is an object of the present disclosure to provide a program, a method, and a system for managing the use of an application.

To achieve the above object, one aspect of the present disclosure provides a non-transitory computer-readable medium that stores a program. The program, when executed by circuitry, causes the circuitry to obtain a use condition for restricting use of an application in a first client device of a first user, obtain a use status of the application in the first client device, and responsive to the use status not satisfying the use condition, send a notification to a second client device of a second user different from the first user, and/or restrict the use of the application in the first client device.

Another aspect provides a method including obtaining, by circuitry, a use condition for restricting use of an application in a first client device of a first user, obtaining, by the circuitry, a use status of the application in the first client device, and responsive to the use status not satisfying the use condition, sending, by the circuitry, a notification to a second client device of a second user different from the first user, and/or restrict the use of the application in the first client device.

A further aspect provides a system including circuitry. The circuitry is configured to obtain a use condition for restricting use of an application in a first client device of a first user, obtain a use status of the application in the first client device, and responsive to the use status not satisfying the use condition, send a notification to a second client device of a second user different from the first user, and/or restrict the use of the application in the first client device.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently preferred embodiments together with the accompanying drawings in which:

FIG. 2 is a schematic diagram illustrating the data configuration of a use condition;

FIGS. 3A and 3B are schematic diagrams each illustrating the data configuration of an application;

FIGS. 4A to 4C are schematic diagrams each illustrating the flow of processing attribute information;

FIG. 5 is a flowchart illustrating the procedures for a process for setting a use condition;

FIG. 6 is a flowchart illustrating the procedures for a process for applying use restriction;

DETAILED DESCRIPTION OF THE PREFERRED EMBODIMENTS

One embodiment of a program, a method, and a system for managing the use of an application will now be described with reference to FIGS. 1 to 7. In the present embodiment, a case in which the use of an application by a user (first user) who uses the application is managed by a manager (second user) will be described. For example, the user is a minor, and the manager is a guardian who supervises the minor.

Figure 1:
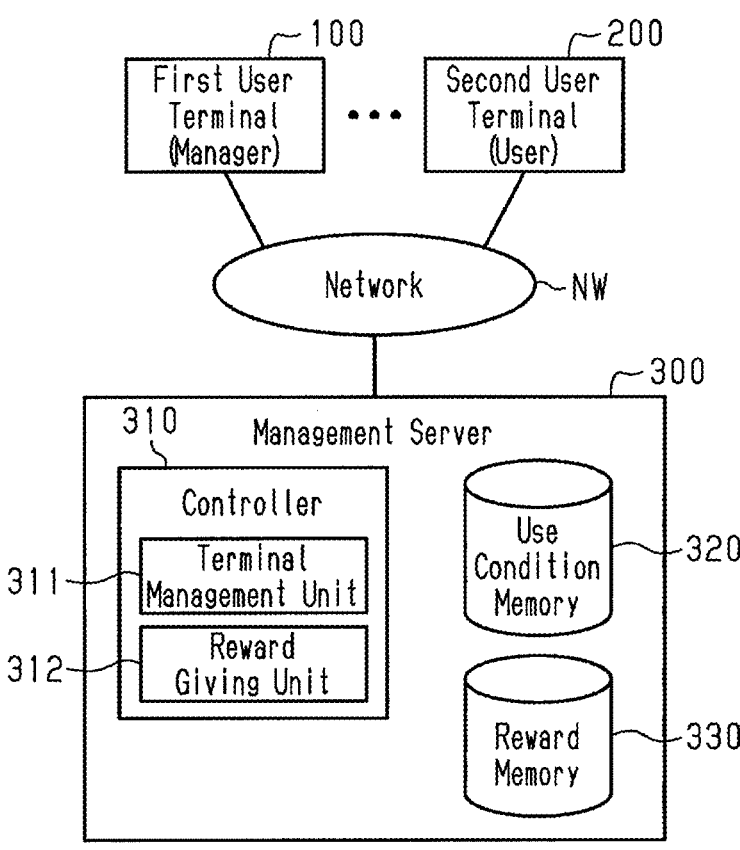
FIG. 1 is a schematic diagram illustrating one embodiment of a system.

As shown in FIG. 1, in the present embodiment, user terminals (client devices) and a management server 300, which are connected to a network NW, are used. The user terminals include a first user terminal 100 and a second user terminal 200.

The first user terminal 100 is a computer terminal operated by the manager and includes a processor such as a CPU and a volatile memory such as a RAM. The first user terminal 100 controls various units of the first user terminal 100, for example, controls communication by a communication unit, reads and writes information in a memory, and performs various calculation processes, based on programs and data stored in the memory. Further, the memory stores various applications including a management program used to manage the use of the applications by the user. The processor inputs and outputs information by executing the applications. The first user terminal 100 is, for example, a multi-function mobile terminal (smartphone), a personal computer (PC), and a tablet device.

The second user terminal 200 is a computer terminal operated by the user and includes a processor such as a CPU and a volatile memory such as a RAM. The second user terminal 200 controls various units of the second user terminal 200, for example, controls communication by a communication unit, reads and writes information in a memory, and performs various calculation processes, based on programs and data stored in the memory. The processor inputs and outputs information by executing various applications. The second user terminal 200 is, for example, a multi-function mobile terminal (smartphone), a personal computer (PC), a tablet device, and a home video game console.

The management server 300 includes a controller 310, a use condition memory 320, and a reward memory 330.

As shown in FIG. 2, the use condition memory 320 stores identification information of the manager in association with identification information of the user. One piece of identification information of the manager may be associated with one piece of identification information of the user or may be associated with multiple pieces of identification information of the user. The identification information of the manager may be a user ID of the manager or a terminal ID of the user terminal used by the manager. The identification information of the user may be a user ID or a terminal ID of the user terminal used by the user. In addition, the use condition memory 320 stores, in association with the identification information of the manager and the identification information of the user, identification information (application ID) of an application that is available in the second user terminal 200 and managed by the manager.

Further, the use condition memory 320 stores a use condition, which is a condition for restricting the use of an application, in association with the identification information of the manager, the identification information of the user, and the identification information of the application to be managed. When the manager inputs information on a use condition to the first user terminal 100, the use condition is registered in the second user terminal 200 via the management server 300. The use condition may include a use amount upper limit, which is an upper limit of the use amount in a predetermined period, a use time upper limit, which is an upper limit of the use time in a predetermined period, a use time of day, and a transmission/reception status of a message. The use amount upper limit may include at least one of an upper limit value (for example, 1000 yen per month) of the amount billed to obtain, for example, an item or expansion of functions in the application and an upper limit value of traffic such as the amount of data transmitted and received. The billing amount may be the amount of currency or points usable in the application or may be a parameter associated with the user in a game. In addition, the use time upper limit is, for example, "1 hour per day" or "2 hours per holiday." The use time is the amount of time in which the use in a predetermined period is accumulated. As long as the accumulated use time in the predetermined period is less than or equal to the amount of time specified in the use condition, the user can use the application. Instead, the use time may be a time for the user to continue to use the application. For example, in a case in which the use time specified in the use condition is "2 hours," when the user continues to use the application for 1 hour and uses the application for more than 1 hour after a 15-minute interruption, the use condition may be satisfied. When the user continues to use the application for more than 2 hours, it is determined that use restriction is reached (i.e., use condition is violated). A threshold value (for example, 15 minutes) of the amount of time required to regard the reach as interruption of the use of the application may be specified. Further, the specification of the use condition using a use time of day includes, for example, "from daytime to 9 p.m.," "from 6 p.m. to 8 p.m.," "until 8 p.m. on a weekday," and "only holiday." Additionally, the specification of combining times of day with the length of a time such as "2 hours of 5 p.m. to 9 p.m." may be set. In addition, the transmission/reception status of a message is, for example, restriction of data subject to communication (transmission restriction of position information and the like) or restriction on messaging using a communication function in a social networking service (SNS) and an application (for example, transmission/reception of a message such as an email transmitted and received between players in the game, post in the game, and chat in a guild to which multiple players belong). Further, in addition to the restriction of the use of the application by the user as described above, the use restriction includes notifying, from the second user terminal 200 used by the user, the first user terminal 100 used by the manager that the user violates the use condition while keeping the user using the application.

The controller 310 functions as a terminal management unit 311 and a reward giving unit 312 by executing programs stored in a memory.

The terminal management unit 311 receives, from the first user terminal 100, a request of registering the use condition of an application on the second user terminal 200 together with use information on the use condition. When receiving the request, the terminal management unit 311 registers the use condition by associating the input information from the first user terminal 100 with the identification information of the manager, the identification information of the user, and the identification information of the application and by recording the input information in the use condition memory 320. Further, when receiving the request from the second user terminal 200, the terminal management unit 311 reads the use condition corresponding to the identification information of the user from the use condition memory 320 and applies the read use condition to the second user terminal 200. The terminal management unit 311 may transmit, to the second user terminal 200, the use condition of the application at a timing of receiving a request transmitted when the application executes a predetermined process in the second user terminal 200 or may simultaneously transmit the use conditions of multiple applications to the second user terminal 200 at a predetermined timing. The timing is not particularly limited.

The use condition is applied to the second user terminal 200 in the following manner. As shown in FIG. 3A, when an application 110 is implemented for a terminal in which the use of the application is not managed, such as the first user terminal 100, the application 110 may include a management module 110A describing a management function of the application. As shown in FIG. 3B, when an application 210 is implemented for the second user terminal 200, i.e., a user terminal in which the use of the application is managed, the application 210 includes a management module 210A describing a management function of the application and a software development kit (SDK) module 210B describing a management function of the application using an SDK. The management function of the application includes a processing function on use restriction such as obtaining a use condition stored outside the terminal, obtaining the use status of each application, sending a notification to the first user terminal 100 when the use condition is not satisfied, and/or restricting the use of the application.

The reward giving unit 312 obtains the use status of an application of the second user terminal 200 via the network NW. The reward giving unit 312 monitors whether or not the use status obtained from the second user terminal 200 satisfies the use condition of the second user terminal 200 for a certain period, i.e., whether or not the user conforms to the use condition for a certain period. When the use status of an application satisfies the use condition for a certain period, the reward giving unit 312 obtains a reward associated with the application or identification information of the reward from the reward memory 330. In this case, the reward may be available in the application. For example, when the application is a game, the reward is a game content available in the game. The game content is electronic data associated with the game such as an object in the data and may be, for example, obtained, possessed, used, managed, exchanged, combined, reinforced, sold, abandoned, or donated by the user in the game. The game content includes any content such as cards, items, virtual currency, tickets, characters, avatars, levels, statuses, parameters (for example, health values and attack powers), skills, abilities, spells, and jobs. The game content does not have to be used in the manner explicitly described in the specification.

The reward giving unit 312 may monitor whether or not the number of times the use status obtained from the second user terminal 200 has satisfied the use condition of the second user terminal 200 is greater than or equal to a predetermined number of times or monitor whether or not the number of times the use status has not satisfied the use condition is less than the predetermined number of times. For example, in a case in which the use condition is "from 6 p.m. to 8 p.m.," the reward giving unit 312 may give a reward to the user when the number of times the user has used the application without conforming to the specification is less than a predetermined number of times (for example, three times) in a predetermined period (for example, 1 month). In addition, a reward may be hierarchically organized in accordance with the number of times the user uses the application satisfying the use condition or the number of times the user has used the application without satisfying the use condition. That is, a reward may be gradually changed. For example, the value of a reward given when the number of times the user has used the application without satisfying the use condition for the predetermined period is zero is set to be higher than the value of a reward given when the number of times is one.

The reward giving unit 312 obtains a reward stored in the reward memory 330 or identification information of the reward and transmits it to the second user terminal 200. When receiving a reward or identification information of the reward, the second user terminal 200 stores the received reward or identification information of the reward in the memory of the second user terminal 200. When receiving identification information of a reward, the second user terminal 200 reads data corresponding to the identification information of the reward and stores it as data possessed by the user. The function of the reward giving unit 312 may be a function of the SDK module 210B of the second user terminal 200.

The flow of a process for registering attribute information on the user will now be described with reference to FIGS. 4A to 4C. In the present embodiment, a case of registering the age of the user as attribute information will be described. The timing of inputting the age of the user for registration is, for example, when the user executes an application for the first time but may also be a timing corresponding to the specification of the application.

In the example illustrated in FIG. 4A, when the user is required to input the age of the user in the second user terminal 200, the user inputs the age of the user to the second user terminal 200. Then, the second user terminal 200 transmits information representing the input age to the management server 300 via the network NW. The use condition memory 320 of the management server 300 registers or temporarily stores the received information. Subsequently, when the management server 300 registers the information, the second user terminal 200 notifies the first user terminal 100 of the age registration of the user via the network NW. This allows the manager using the first user terminal 100 to see the content of the age registration by the user and check whether or not the age has been falsely registered by the user.

In the example illustrated in FIG. 4B, when the user is required to input the age of the user in the second user terminal 200, the second user terminal 200 requests the first user terminal 100 to input the age of the user via the management server 300 or without the management server 300. Then, the first user terminal 100 requires the manager to input the age of the user. The first user terminal 100 transmits the information that has been input by the manager to the management server 300 via the network NW, and the use condition memory 320 of the management server 300 registers the received information. The age registered in the management server 300 is also registered in the second user terminal 200. Instead, the first user terminal 100 transmits the information input by the manager to the second user terminal 200 via the network NW.

In the example illustrated in FIG. 4C, the age of the user is registered in advance in the management server 300. For example, when the user falsely inputs the age of the user via the second user terminal 200, the second user terminal 200 transmits the information input by the user to the management server 300 via the network NW. Then, the management server 300 verifies the age of the user registered in advance by comparing it with the newly input age of the user. The management server 300 may preliminarily obtain individual information of the user such as information of an individual identification card from outside and register the age of the user in advance based on the information. In addition, the manager may register the age of the user in advance in the management server 300. When the age of the user registered in advance differs from the newly input age of the user, the management server 300 transmits an error notification to the second user terminal 200. When receiving the error notification from the management server 300, the second user terminal 200 notifies the first user terminal 100 of a false input via the network NW. This allows the manager using the first user terminal 100 to check whether or not the age has been falsely registered by the user.

For verification of the input age, an age bracket may be used instead of an age. There may be two age brackets or three or more age brackets. For example, the user may input whether or not the user is 18 years old or over as age information and select any one of age brackets such as "under 12 years old," "12 to 18 years old," "18 to 20 years old," . . . . Further, the management server 300 or the second user terminal 200 may store an age bracket as age information registered in advance. The management server 300 or the second user terminal 200 may compare an age (for example, "16 years old") with an age bracket registered in advance, compare an age bracket input to the second user terminal 200 with an age bracket registered in advance, or compare an age bracket input to the second user terminal 200 with an age registered in advance.

The age of the user registered as described above may be used as a condition for providing a reward given when the use condition is satisfied. For example, a reward given when the use condition is satisfied may be given when the age of the user corresponds to the age of a "minor."

Additionally, the registered age of the user may be used as a condition for setting the use condition. For example, when the age of the user corresponds to the age of a "minor," a condition for using an application may be set.

In addition, in an application, when an age is set at which the user can execute the application or execute part of the function of the application, the age of the user registered in the management server 300 or the second user terminal 200 may be used to determine whether or not the application or part of the function of the application is executable. This prevents false input of an age.

The process for setting the use condition executed by the management server 300 will now be described with reference to FIG. 5.

First, the controller 310 of the management server 300 registers a user (step S10). More specifically, the first user terminal 100 executes a management application including a management program stored in the memory in accordance with an input operation of the manager. The manager inputs identification information of the manager and identification information of the user who uses the application to the management application. The identification information of the manager and the identification information of the user are, for example, identification information of a platform that provides the application. Instead, the identification information of the manager and the identification information of the user may be identification information set to manage the application or other information. The first user terminal 100 transmits, to the management server 300, the identification information of the manager and the identification information of the user that have been input. The controller 310 registers, in the use condition memory 320, the identification information of the manager and the identification information of the user that have been received so that they are associated with each other. After the manager and the user are temporarily registered in the management server 300 in association with each other, the management server 300 does not need to register the same content again. For example, when changing a use condition that has already been set and when setting a use condition for an application newly downloaded to the second user terminal 200 after registration of the manager and the user, step S10 may be omitted.

When registering the identification information of the manager and the identification information of the user, the management server 300 obtains, from the memory of the management server 300 or an external device, identification information of the application including the SDK module 210B among the applications associated with the identification information of the user. The management server 300 stores the obtained identification information of the application in association with the identification of the user.

Next, the controller 310 registers a use condition (step S11). More specifically, the first user terminal 100 requests the management server 300 to register a use condition on the second user terminal 200 in accordance with an input operation of the manager. More specifically, the terminal management unit 311 of the controller 310 transmits, to the first user terminal 100, a list of applications including the SDK module 210B among the applications stored in the second user terminal 200 associated with the identification information of the user. From the list of applications received by the first user terminal 100, the manager selects an application the use of which is managed by the manager. Further, the manager inputs, to the first user terminal 100, the content of a use condition applied to the selected application. The first user terminal 100 transmits, to the management server 300, information indicating the selected application and the use condition set for the application.

When receiving the information indicating the selected application and the use condition set for the application, the controller 310 registers the use condition (step S11) and sets the application to which the use condition is applied (step S12). The timing of executing the step S11 and the timing of executing step S12 may be reversed.

Subsequently, the controller 310 sets a use condition for the application stored in the second user terminal 200 (step S13). For example, the terminal management unit 311 receives a request of checking the use condition from the second user terminal 200 at a predetermined timing such as when executing an application that is to be managed. The terminal management unit 311 reads, from the use condition memory 320, a use condition corresponding to the application associated with the identification information of the user and the request and transmits the read use condition to the second user terminal 200. The second user terminal 200 receives the use condition, which has been set by the manager to the application to be managed, and stores the use condition in the memory in association with the identification information of the application.

The process for applying use restriction executed by the second user terminal 200 will now be described with reference to FIG. 6. Each time the applications including the SDK module 210B are executed, the second user terminal 200 stores the use status in the memory. For example, when the user purchases an item in the application, the second user terminal 200 adds the billing amount to the accumulated billing amount and stores it in the memory. When a certain period has elapsed, the second user terminal 200 initializes the accumulated billing amount.

The second user terminal 200 obtains the use status of the application of the user from the memory (step S20). In this case, the use status is information registered in each application subject to the application of the use restriction and includes, for example, the date and time when the application was started, the date and time when the application was ended, the date and time when an item in the application was purchased, the content of the purchase, the ID of a person of a message transmitted and received on the application, traffic, and position information.

Next, the second user terminal 200 determines whether or not the use status of the user satisfies the use condition (step S21). More specifically, the second user terminal 200 compares the obtained use status of the application with the use condition applied to the application.

When the use status of the user satisfies the use condition ("YES" in step S21), the second user terminal 200 ends the process shown in FIG. 6 without restricting the use of the application. Even in a case in which the use status satisfies the use condition, when the use status is almost the limit of the use condition, alert information may be output in the second user terminal 200. For example, the use time specified in the use condition is "2 hours" and the use time stored as the use status is "1 hour and a half," alert information indicating that only 30 minutes remain for the use on the display of the second user terminal 200 may be output. The second user terminal 200 or the management server 300 may transmit a notification reporting that the use status is approaching the limit of the use condition to the first user terminal 100 via the network NW. In this case, the manager may be able to understand the use status of the application of the user and directly alert the user to refrain from using the application.

When the use status of the user does not satisfy the use condition ("NO" in step S21), the second user terminal 200 restricts the use of the application (step S22). More specifically, the second user terminal 200 may interrupt the execution of the application and/or notify the first user terminal 100 used by the manager that the use status of the application exceeds the use restriction. In a case in which the application is a web application, when the management server 300 receives, from the second user terminal 200, information indicating that the use status of the user does not satisfy the use condition, the management server 300 stops transmitting data of the application to the second user terminal 200. In a case in which the application is a native application, as part of the function of the SDK module 210B, the second user terminal 200 interrupts the execution of the application and/or restricts part of the function. Further, the second user terminal 200 may display alert information on a screen.

In addition to the application of the use restriction in the second user terminal 200, the second user terminal 200 may transmit the obtained use status of the application to the first user terminal 100. The first user terminal 100 displays the use status of the application received from the second user terminal 200 on the screen. This allows the manager to check the use status of the application by the user of the second user terminal 200 via the first user terminal 100.

The reward process executed by the management server 300 will now be described with reference to FIG. 7.

First, the controller 310 determines whether or not the use status of the user satisfies the use condition for a certain period (step S30). More specifically, the reward giving unit 312 counts a time elapsed from when applying the use condition. While counting the elapsed time, the reward giving unit 312 obtains the use status from the second user terminal 200 and compares the obtained use status with the use condition at a predetermined timing.

When the use status of the user satisfies the use condition for a certain period ("YES" in step S30), the controller 310 gives a reward to the user of the second user terminal 200 (step S31). More specifically, the reward giving unit 312 obtains, from the reward memory 330, a reward associated with an application that satisfies the use condition or identification information of the reward. For example, when the application is a game, a predetermined number of game contents serving as rewards may be given as possessions of the user. That is, a predetermined number of game contents may be stored in association with the identification information of the user. In addition, a use period may be set for a game content. The user is unable to use a game content in which the use period has elapsed.

Figure 7:
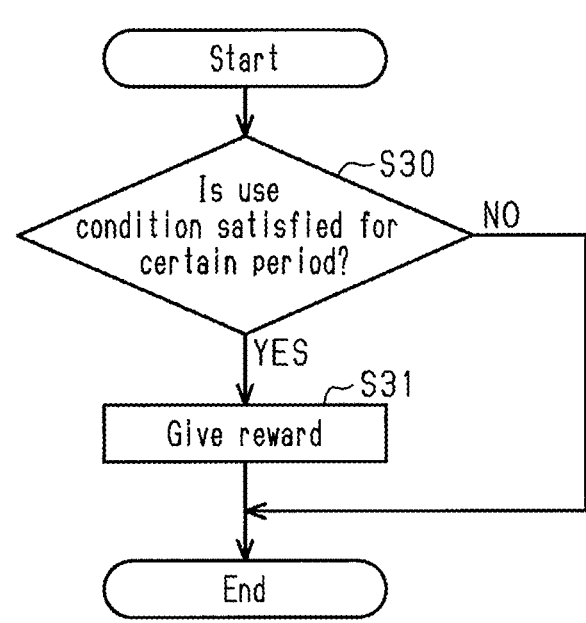
FIG. 7 is a flowchart illustrating the procedures for a reward process.

When the use status of the user does not satisfy the use condition for a certain period ("NO" in step S30), the controller 310 ends the process shown in FIG. 7 without giving a reward to the user.

Thus, setting the use condition for the application allows the user such as a minor to use the application within a proper range under the supervision of the manager such as a guardian. This is expected to produce, for example, the effect of preventing an administrator or the like of the application from unintentionally billing the user on a frequent basis. Further, the manager can understand the life cycle of the user and the actual status of application use. This allows the manager and the user to have a unified recognition on how to properly use a user terminal such as a smartphone.

As described above, the above embodiment has the following advantages.

(1) In the above embodiment, when the use status of an application in the second user terminal 200 is obtained and the obtained use status does not satisfy the use condition, a notification is sent to the first user terminal 100 used by the manager and/or the use of the application in the second user terminal 200 used by the user is prohibited. Thus, the manager can allow the user to use the application within a proper range.

(2) In the above embodiment, when a billing amount in a predetermined period in the second user terminal 200 is obtained and the obtained billing amount exceeds an upper limit value of the billing amount, a notification is sent to the first user terminal 100 used by the manager and/or the use of the application in the second user terminal 200 used by the user is prohibited. Thus, the manager can allow the user to use the application within a range that does not exceed the upper limit value of the billing amount. This also prevents an administrator or the like of the application from unintentionally billing the user on a frequent basis.

(3) In the above embodiment, when a use time in a predetermined period in the second user terminal 200 is obtained and the use time exceeds an upper limit value of the billing amount, a notification is sent to the first user terminal 100 used by the manager and/or the use of the application in the second user terminal 200 used by the user is prohibited. Thus, the manager can allow the user to use the application within a range that does not exceed the upper limit value of the use time.

(4) In the above embodiment, when a record of a use time of day of the application in the second user terminal 200 is obtained and the obtained record does not satisfy the condition for the specified use time of day, a notification is sent to the first user terminal 100 used by the manager and/or the use of the application in the second user terminal 200 used by the user is prohibited. Thus, the manager can allow the user to use the application within a range that satisfies the condition of the specified use time of day, for example, when a time of day specified in advance does not elapse.

(5) In the above embodiment, when the use condition on a transmission/reception status of a message in the second user terminal 200 is obtained and the transmission and reception of a message is restricted, a notification is sent to the first user terminal 100 used by the manager and/or the use of the application in the second user terminal 200 used by the user is prohibited. Thus, the manager can allow the user to use the application within a range that satisfies the restriction on the transmission and reception of a message, for example, satisfies the restriction of transmitting position information.

(6) In the above embodiment, in the second user terminal 200, the age of the user input as attribute information to an application to be managed is obtained and the obtained age of the user is compared with the age of the user stored in the use condition memory 320. As a result of verifying the ages of the users, when the two ages do not match, a notification is sent to the first user terminal 100 used by the manager and/or the use of the application in the second user terminal 200 used by the user is prohibited. Thus, the manager can prevent the user from using the application beyond a proper range by falsely inputting the age of the user.

(7) In the above embodiment, when the age of the user serving as attribute information is not registered in the use condition memory 320, the age of the user registered through the second user terminal 200 used by the user is notified to the first user terminal 100 used by the manager. This notifies the manager of the age registered by the user.

(8) In the above embodiment, in a case in which an application to be managed is executed, when the age of the user is not registered in the use condition memory 320, the first user terminal 100 used by the manager is required to input the age of the user. This allows the manager to properly manage attribute information of the user.

(9) In the above embodiment, when it is determined whether or not the application use history satisfies the use condition during a predetermined period and it is determined that the application use history satisfies the use condition, a reward available in the application is given to the user. This satisfies the use condition of the application and thus motivates the user to set the use condition of the application.

The above embodiment may be modified as described below.

In the above embodiment, the user who uses an application is a child and the manager who manages the use of the application is the guardian of the child. However, as long as the management server 300 associates the user with the manager, the user is not limited to a child and the manager is not limited to the guardian of the child.

In the above embodiment, for each application, a use condition specifying restriction on the use of the application is registered. Instead, for each group including one or more applications, a use condition specifying restriction on the use of the applications included in the group may be registered.

The process for registering a use condition for each group will now be described.

Figure 8:
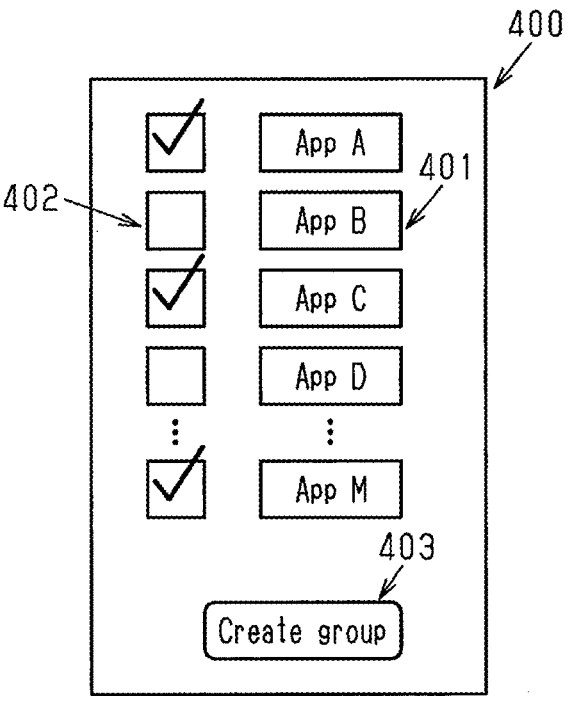
FIG. 8 is a schematic diagram illustrating an example of a setting view of an application subject to use restriction.

As shown in FIG. 8, when the manager launches a management application in the first user terminal 100, the first user terminal 100 outputs a group creation view 400 to the display of the first user terminal 100 in accordance with an input operation of the manager. The display of the first user terminal 100 integrally includes a touch panel that detects a touch of a finger, a stylus, or the like. The group creation view includes identification indicators 401 such as texts or icons used to identify applications, selection elements 402 such as checkboxes used to select the applications respectively corresponding to the identification indicators 401, and a creation execution element 403 used to create a group from the application selected by a selection element 402. The group creation view displays a list of applications subject to management of the first user terminal 100 among the applications stored in the second user terminal 200. The first user terminal manages the application of the SDK module 210B. The identification information of the application is obtained from the management server 300.

The manager performs an operation such as checking a selection element 402 to select an application for which a use condition is set. Then, the manager selects the creation execution element 403 to create a group including the selected application. When the manager selects the creation execution element 403, the display of the first user terminal 100 outputs a setting view of the use condition. On the setting view of the use condition, multiple use conditions corresponding to the created group are displayed by, for example, a pull-down menu in a selectable manner. The manager selects one or more of the displayed use conditions. When a use condition is selected, the first user terminal 100 transmits, to the management server 300, identification information of one or more selected applications and use conditions set for a group of the one or more applications. The identification information of one or more selected applications and the use conditions set for a group of the one or more applications may be transmitted to the management server 300 at different timings.

Figure 9A:
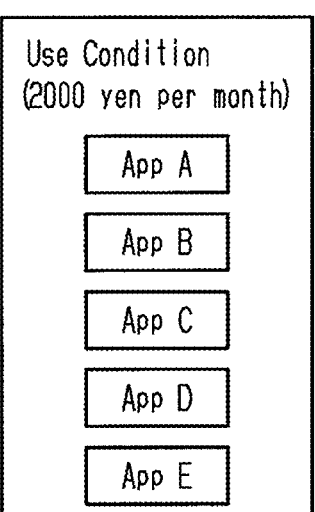
FIGS. 9A to 9C are schematic diagrams each illustrating an example of a setting view of a use condition.
Figure 9B:
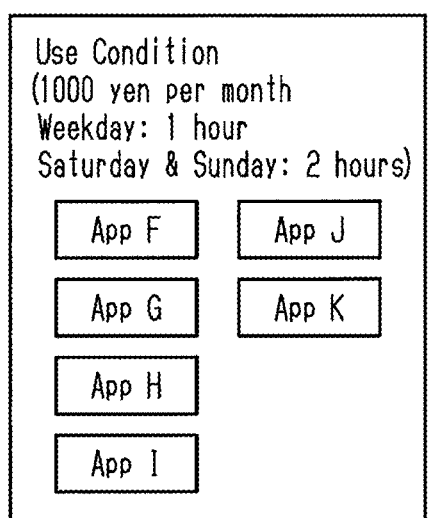
Figure 9C:
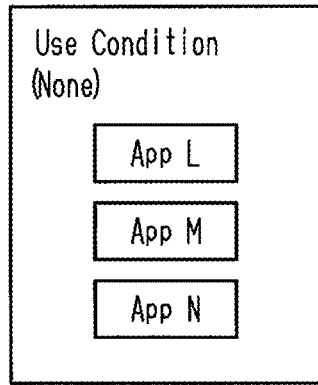

As shown in FIG. 9, the management server 300 stores the identification information of one or more applications, which is transmitted from the first user terminal 100, in association with use conditions set for the group of the one or more applications. In the example shown in FIG. 9A, "App A" to "App E" are set as one group. Further, the upper limit of billing (2000 yen) in a predetermined period (1 month) is stored in association with the group as a use condition. In the example shown in FIG. 9B, "App F" to "App K" are set as one group. Further, the upper limit of billing (1000 yen) in a predetermined period (1 month), the upper limit (1 hour) of the use time of the application on a weekday, and the upper limit (2 hours) of the use time of the application on Saturday and Sunday are stored in association with the group as use conditions. The "use time" may be a use time for each application that belongs to the group or may be a time in which the use times are accumulated. In the example shown in FIG. 9C, "App L" to "App N" are set as one group. Further, the use condition "No Restriction" is set for this group.

The management server 300 obtains the use status for each application from the second user terminal 200 and determines the use status of each group based on the obtained use status. For example, for applications that belong to a group to which "2000 yen per month" is set as a use condition, the billing amount for each application is obtained and the billing amounts are added to the accumulated billing amount.

The management server 300 compares the use condition with the use status for each group at a predetermined timing.

When determining that the use condition is not satisfied, the management server 300 restricts the use of all the applications included in the group. For example, when the application is a web application, the management server 300 stops transmitting, to the second user terminal 200, data of the application from a server that provides the application. Further, when the application is a native application, the management server 300 transmits a request of restricting the use of the application to the second user terminal 200. When receiving the request, the second user terminal 200, as part of the function of the SDK module 210B, interrupts execution of the application, restricts part of the function, or displays alert information on the screen.

Although the example in which the manager creates a group of applications has been described, a use condition may be set for a group that has been set in advance. One example of the group set in advance is a category on a platform that provides applications, such as "game," "music," "entertainment," "social networking," "news," and "shopping." The manager uses the first user terminal 100 to set the use condition of an application that belongs to the "game" group. For example, the manager restricts the use of the application that belongs to the "game" to "the billing amount per month is up to 2000 yen" This saves time and effort for the manager to divide applications into groups.

Thus, when the manager creates a group of applications and sets a use condition for each group, even if multiple applications have been installed in the second user terminal 200, the time and effort for the manager to manage the use of an application by the user is reduced.

In the above embodiment, for the application in which the use condition is not satisfied, the use of the application by the user is restricted. In addition, the execution of the application the use of which is restricted may be permitted in accordance with an input operation on the first user terminal 100 performed by the manager. More specifically, when the use of the application is restricted, notification is transmitted from the management server 300 or the second user terminal 200 to the first user terminal 100. When receiving the notification, the first user terminal 100 outputs the received notification to the display. The notification includes a link to a cancellation view. When the manager selects the link, the cancellation view is displayed on the display of the first user terminal 100. Using this cancellation view, the manager cancels restriction of the use of the application (interruption of the execution of the application) so that the first user terminal 100 transmits a cancellation instruction to the management server 300 or the second user terminal 200. This allows the user to resume the execution of the application in the second user terminal 200.

In the above embodiment, for the application in which the use condition is not satisfied, the use of the application by the user is restricted. In addition, the second user terminal 200 may transmit a request on use restriction to the first user terminal 100 in accordance with an operation of the user. The request includes, for example, relaxation of the use restriction, change of setting of an upper limit value, and resumption of an interrupted application. When receiving the request in the first user terminal 100, the manager responds to the request by, for example, changing the use restriction or executing a process for making the interrupted application resumable. This allows the manager and the user to have a further unified recognition on the proper use of the application.

In the above embodiment, the second user terminal 200 obtains a use condition and a use status of an application. When the use status does not satisfy the use condition, the second user terminal 200 sends a notification to the first user terminal 100 and/or restricts the use of the application. Instead, the management server 300 may execute at least one of the processes. For example, the management server 300 receives the use status of the application from the second user terminal 200 and stores it in the memory. Further, the management server 300 receives the use condition set for each application or set for each group of applications from the first user terminal 100 and stores it in the memory. The management server 300 determines whether or not the use status satisfies the use condition at a predetermined timing such as a timing at which the use status is updated. When the use status does not satisfy the use condition, the management server 300 transmits an instruction of restricting the use of the application to the second user terminal 200 or to an external device or the like that transits the data of the application. When the second user terminal 200 receives the instruction, the second user terminal 200 uses the function of the SDK module 210B to interrupt execution of the application and display an alert on the display. When the external device receives the instruction of restricting the use of the application, the external device may interrupt the transmission of the data of the application.

In the above embodiment, as an example of the use condition on the transmission/reception status of a message, the transmission of position information in the second user terminal 200 is restricted. However, the transmission/reception status of a message included in the use condition is not limited to this example and may be, for example, transmission/reception of SNS information or transmission of image information.

In the above embodiment, when the second user terminal 200 requires input of the age of the user, the manager registers the age of the user to the management server 300 via the first user terminal 100. However, the age of the user does not have to be registered at this timing. For example, the user or the manager may register the age of the user to the management server 300 at a desired timing.

In the above embodiment, when a use condition is satisfied for a certain period, a reward is given to the user who uses the application. In addition to or instead of the user, a reward may be given to the manager. Alternatively, no reward may be given to the user or the manager.

In the above embodiment, at least some of the operations and processes executed by the user terminals 100 and 200 may be executed by the management server 300, which is connected to the user terminals 100 and 200. For example, the process for controlling various applications executed by the user terminals 100 and 200 may be executed by any one of the management server 300 and the user terminals 100 and 200. Further, the process for controlling various applications may be executed cooperatively by the management server 300 and the user terminals 100 and 200.

An information processing device such as a computer or a mobile phone can be used as the management server 300 or the user terminals 100 and 200 according to the above embodiment. Such an information processing device can be implemented by storing a program describing a processing content that implements each function of the management server 300 or the user terminals 100 and 200 according to the embodiment, in a memory of the information processing device, by using the CPU of the information processing device to read the program, and by causing the CPU to execute the program.

The controller 310 is not limited to one that performs software processing on all processes executed by itself. For example, the controller 310 may be equipped with a dedicated hardware circuit (e.g., application specific integrated circuit: ASIC) that performs hardware processing on at least some of the processes to be executed by itself. That is, the controller 310 may be configured as circuitry including 1) one or more processors that operate in accordance with a computer program (software), 2) one or more dedicated hardware circuits that execute at least some of the various processes, or 3) combinations thereof. The processor includes a CPU and memories such as a RAM and a ROM, and the memory stores program codes or instructions configured to cause the CPU to execute the processing. The memories, that is, computer-readable media, include any type of media that are accessible by general-purpose computers and dedicated computers.

The invention claimed is:

1. A system, comprising:
a first device including first circuitry; and
a second device including second circuitry, wherein
the first circuitry of the first device is configured to
    set a first use restriction condition for the second circuitry of the second device, the first use restriction condition being for restricting execution of applications executable by the second circuitry of the second device to be within a specific period of time of a day,
    send information related to the first use restriction condition to a management server,
    register a second use restriction condition for restricting execution of applications in a category of applications when a billing use amount exceeds a billing use amount upper limit during a predetermined period,
    receive, from the management server, a determination of whether the second device has satisfied the first use restriction condition a predetermined number of times,
    in response to the first use restriction condition being satisfied the predetermined number of times, the second device is configured to receive one or more rewards from the management server, and in response to the billing use amount exceeding the billing use amount upper limit, restrict execution of the applications in the category by the second device.

2. The system according to claim 1, wherein in response to the first use restriction condition not being satisfied a plurality of times, the one or more rewards are changed to have reduced value, and in response to the first use restriction condition being satisfied the plurality of times, the one or more rewards are changed to have an increased value.

3. The system according to claim 2, wherein the first use restriction condition includes restricting the second device from using the one or more rewards stored in reward memory of the management server until the first use restriction condition is satisfied the predetermined number of times.

4. The system according to claim 1, wherein the first device is further configured to communicate with the management server to register a third use restriction condition for restricting execution of the applications by the second device based on an age of a user of the second device.

5. The system according to claim 4, wherein the second circuitry is further configured to input the age of the user for one of the applications, in response to the second device inputting the age of the user for the one of the applications, the system is configured to determine whether the inputted age meets the second use restriction condition, and in response to the inputted age not meeting the second use restriction condition, the second device is configured to receive an error notification to the second device.

6. The system according to claim 4, wherein in response to one of the applications requesting the age of the user, the second device transmits a request to the first device to input the age of the user.

7. A method for managing the user of applications, the method comprising:

setting, by a first device, a first use restriction condition for a second device;

sending, by the first device, information related to the first use restriction condition to a management server, the first use restriction condition being for restricting execution of the applications executable by the second device to be within a specific period of time of a day, registering, by the first device, a second use restriction condition for restricting execution of applications in a category of applications when a billing use amount exceeds a billing use amount upper limit during a predetermined period, transmitting, by the management server, a determination of whether the second device has satisfied the first use restriction condition a predetermined number of times to the first device, in response to the first use restriction condition being satisfied the predetermined number of times, transmitting, by the management server, one or more rewards stored in reward memory of the management server to the second device, and in response to the billing use amount exceeding the billing use amount upper limit, restricting execution of the applications in the category, by the second device.

8. The method according to claim 7, further comprising in response to the first use restriction condition not being satisfied a plurality of times, changing the one or more rewards to have reduced value, and in response to the first use restriction condition being satisfied the plurality of times, changing the one or more rewards to have an increased value.

9. The method according to claim 8, wherein the first use restriction condition includes restricting the second device from using the one or more rewards stored in the reward memory of the management server until the first use restriction condition is satisfied the predetermined number of times.

10. The method according to claim 7, wherein the method further includes registering with the management server, by the first device, a third use restriction condition for restricting execution of the applications by the second device based on an age of a user of the second device.

11. The method according to claim 10, wherein the method further includes:

in response to the second device inputting the age of the user for one of the applications, determining, by the management server, whether the inputted age meets the second use restriction condition, and in response to the inputted age not meeting the second use restriction condition, transmitting, by the management server, an error notification to the second device.

12. The method according to claim 10, wherein the method further includes in response to one of the applications requesting the age of the user, transmitting, by the second device, a request to the first device to input the age of the user via the management server.

13. A non-transitory computer-readable medium that stores a program, wherein the program, when executed by circuitry of a management server, causes the circuitry to receive, from a first device, a first use restriction condition for a second device, the first use restriction condition being for restricting execution of the applications executable by the second device to be within a specific period of time of a day, determine whether the second device has satisfied the first use restriction condition a predetermined number of times, register a second use restriction condition for restricting execution of applications in a category of applications when a billing use amount exceeds a billing use amount upper limit during a predetermined period, in response to the first use restriction condition being satisfied the predetermined number of times, transmit one or more rewards stored in the management server to the second device, and in response to the billing use amount exceeding the billing use amount upper limit, restrict execution of the applications in the category.

14. The non-transitory computer-readable medium of claim 13, wherein the circuitry:

in response to the first use restriction condition not being satisfied a plurality of times, changes the one or more rewards to have reduced value, and in response to the first use restriction condition being satisfied the plurality of times, changes the one or more rewards to have an increased value.

15. The non-transitory computer-readable medium of claim 14, wherein the first use restriction condition includes restricting the second device from using the one or more rewards until the first use restriction condition is satisfied the predetermined number of times.

16. The non-transitory computer-readable medium of claim 14, wherein the circuitry further receives, from the first device, a third use restriction condition for restricting execution of the applications based on an age of a user of the second device.

17. The non-transitory computer-readable medium of claim 16, wherein in response to the second device inputting 5 the age of the user for the one of the applications, the circuitry further causes the management server to determine whether the inputted age meets the second use restriction condition, and in response to the inputted age not meeting the second use 10 restriction condition, the circuitry causes the management server to transmit an error notification to the second device.

18. The non-transitory computer-readable medium of claim 16, wherein in response to one of the applications 15 requesting the age of the user, the second device transmits, via the management server, a request to the first device to input the age of the user.

\*   \*   \*   \*   \*